United States Patent
Shiomi et al.

(10) Patent No.: US 8,320,074 B2
(45) Date of Patent: Nov. 27, 2012

(54) MAGNETIC HEAD AND CARD READER EQUIPPED WITH THE MAGNETIC HEAD

(75) Inventors: Toshiro Shiomi, Nagano (JP); Kazunori Takahashi, Nagano (JP); Shigeo Nakajima, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 13/389,133

(22) PCT Filed: Aug. 4, 2010

(86) PCT No.: PCT/JP2010/063174
§ 371 (c)(1),
(2), (4) Date: Mar. 15, 2012

(87) PCT Pub. No.: WO2011/016481
PCT Pub. Date: Feb. 10, 2011

(65) Prior Publication Data
US 2012/0162804 A1 Jun. 28, 2012

Related U.S. Application Data

(60) Provisional application No. 61/232,174, filed on Aug. 7, 2009.

(30) Foreign Application Priority Data

Sep. 25, 2009 (JP) ................. 2009-221093

(51) Int. Cl.
*G11B 5/027* (2006.01)

(52) U.S. Cl. ..................................... 360/110

(58) Field of Classification Search .................. 360/110, 360/75, 125.04, 235.4, 245.3, 234.6, 236.5, 360/29
See application file for complete search history.

(56) References Cited

U.S. PATENT DOCUMENTS

2008/0117550 A1* 5/2008 Zhang ........................ 360/235.4

FOREIGN PATENT DOCUMENTS

| JP | 2001-143213 | 5/2001 |
| JP | 2005-136391 | 5/2005 |
| JP | 2008-293628 | 12/2008 |

OTHER PUBLICATIONS

International Search Report for Application No. PCT/JP2010/063174 mailed Sep. 7, 2010.

* cited by examiner

*Primary Examiner* — Allen Cao
(74) *Attorney, Agent, or Firm* — Frommer Lawrence & Haug LLP

(57) ABSTRACT

A magnetic head which includes a core, a coil wound on the core, terminals to which ends of the coil are connected. The magnetic head also includes a substrate on which mounted are a demodulating electronic component for demodulating an analog output signal output from the terminals to create a digital demodulated signal, and an encrypting electronic component for encrypting the demodulated signal to create an encrypted signal. A cable electrically connects the demodulating electronic component and the terminals. A case body stores the core, the coil, the terminals, and the cable. The demodulating electronic component is mounted on one side of the substrate, and the encrypting electronic component is mounted on the other side of the substrate. The substrate is fixed to the case body so that the demodulating electronic component is placed inside the case body while the encrypting electronic component is placed outside the case body.

9 Claims, 4 Drawing Sheets

US 8,320,074 B2

MAGNETIC HEAD AND CARD READER EQUIPPED WITH THE MAGNETIC HEAD

The present application claims priority from PCT Patent Application No. PCT/JP2010/063174 filed on Aug. 4, 2010, which claims priority from Japanese Patent Application No. JP 2009-221093 filed on Sep. 25, 2009, which claims priority from U.S. Provisional Patent Application Ser. No. 61/232,174 filed on Aug. 7, 2009, the disclosures of which is incorporated herein by reference in its entirety.

FIELD OF THE INVENTION

The present invention relates to a magnetic head for reading magnetic data recorded in a card, and a card reader equipped with the magnetic head.

DESCRIPTION OF RELATED ART

Conventionally, card readers for reading magnetic data recorded in a card are widely used. In the case of such a card reader, for example, magnetic data recorded in a card is read by a magnetic head placed in a card passing path through which the card passes. Incidentally, in the industry where card readers are used, there has been a major issue of so-called "skimming" heretofore that a criminal attaches a signal wire to a magnetic head to illegally obtain magnetic information of a card.

In this situation, conventionally proposed is a magnetic head that enables a prevention of such skimming (For example, refer to Japanese Unexamined Patent Application Publication No. 2001-143213 ("JP 2001-143213")). In the case of a magnetic head described in JP 2001-143213, a control unit is stored together with a main body of the magnetic head in a magnetic head case, wherein mounted in the control unit are a demodulating circuit for demodulating magnetic data recorded in a card according to an output signal from a coil included in a main body of the magnetic head, and an encrypting circuit for encrypting magnetic information demodulated by the demodulating circuit, by using a predetermined encrypting function and key data. Thus, encrypted magnetic information is output from the magnetic head. Therefore, using the magnetic head enables a prevention of a skimming action for illegally obtaining the magnetic information of the card out of a signal wire attached to the magnetic head.

As described above, using the magnetic head described in JP 2001-143213 enables a prevention of skimming. Meanwhile, unfortunately the control unit, in which the demodulating circuit and the encrypting circuit are mounted, is stored in the case, and therefore the magnetic head is large-sized.

SUMMARY OF THE INVENTION

Then, it is a subject of the present invention to provide a magnetic head that enables a prevention of illegally obtaining magnetic information of a card, and can be downsized. Furthermore, it is another subject of the present invention to provide a card reader equipped with the magnetic head.

To bring a solution for the subject described above, a magnetic head according to the present invention includes: a core in which a magnetic gap is formed for reading magnetic data recorded in a card; a coil wound on the core; terminals to which ends of the coil are connected; a substrate on which mounted are a demodulating electronic component for demodulating an analog output signal output from the terminals to create a digital demodulated signal, and an encrypting electronic component for encrypting the demodulated signal to create an encrypted signal; a cable for electrically connecting the demodulating electronic component and the terminals; and a case body for storing the core, the coil, the terminals, and the cable; wherein the demodulating electronic component is mounted on one side of the substrate; the encrypting electronic component is mounted on the other side of the substrate; and the substrate is fixed to the case body in such a way that the demodulating electronic component is placed inside the case body while the encrypting electronic component is placed outside the case body.

In the magnetic head according to the present invention, the coil wound on the core, the terminals to which the ends of the coil are connected, the demodulating electronic component for demodulating the output signal output from the terminals to create the demodulated signal, and the cable for electrically connecting the demodulating electronic component and the terminals are placed inside the case body of the magnetic head. Accordingly, it is difficult for a criminal to illegally obtain a signal before encryption, without either removing the substrate from the case body, or drilling a hole in the case body. Therefore, according to the present invention, it becomes possible to prevent the criminal from illegally obtaining magnetic information of the card. Furthermore, according to the present invention, the encrypting electronic component is located outside the case body. Therefore, being compared with a case having the encrypting electronic component located inside the case body, the present invention makes it possible to downsize the case body. Accordingly, the present invention makes it possible to downsize the magnetic head.

In the present invention, preferably electrodes for electrically connecting the encrypting electronic component to the substrate is placed on a mounting surface of the encrypting electronic component for mounting onto the substrate. In this case, it is preferable that the encrypting electronic component is an electronic component of a BGA type (Ball Grid Array), in which the plurality of electrodes are placed on the mounting surface, each of the electrodes being almost like a hemisphere. According to this structure, even though the encrypting electronic component is located outside the case body, it becomes difficult for the criminal to attach a signal wire to the electrodes of the encrypting electronic component. Therefore, it becomes difficult for the criminal to illegally obtain a demodulated signal before encryption.

In the present invention, preferably the substrate is a multilayer board in which an insulation layer and a conductive layer are alternately laminated, and a conductor pattern of the substrate for electrically connecting the demodulating electronic component and the encrypting electronic component is included within an external profile of the encrypting electronic component in a view of a thickness-wise direction of the substrate. According to this structure, even though the encrypting electronic component is located outside the case body, it becomes difficult to take out a demodulated signal before encryption from the conductor pattern that electrically connects the demodulating electronic component and the encrypting electronic component. In other words, it becomes difficult for the criminal to illegally obtain a demodulated signal before encryption.

In the present invention, for example, the demodulating electronic component is included within the external profile of the encrypting electronic component in a view of a thickness-wise direction of the substrate.

In the present invention, preferably the encrypting electronic component as well as the other side of the substrate are covered with a resin material. According to this structure, it difficult for the criminal to attach a signal wire to the electrodes of the encrypting electronic component, and to take out a demodulated signal before encryption from the other side of the substrate. Therefore, it becomes further difficult for the criminal to illegally obtain a demodulated signal before encryption.

In the present invention, preferably an internal area of the case body is filled with a resin material. According to this structure, if the criminal removes the substrate from the case body by force, the cable gets broken and/or the demodulating electronic component gets damaged. Accordingly, even if the criminal removes substrate from the case body, it is difficult to illegally obtain a signal before encryption.

Moreover, in this case, preferably the cable is so guided inside the case body as not to contact an internal surface of the case body. According to this structure, even if the criminal drills a hole in the case body, the cable inside the case body cannot easily be found. Therefore, even if the criminal drills a hole in the case body, it becomes difficult to illegally obtain a signal before encryption from the cable.

The magnetic head according to the present invention can be used for a card reader. The card reader makes it possible to prevent the criminal from illegally obtaining magnetic information of the card. Furthermore, since the card reader makes it possible to downsize the magnetic head, the card reader can be downsized.

As described above, according to the present invention, it becomes possible to prevent illegally obtaining magnetic information of the card, and furthermore the magnetic head can be downsized.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
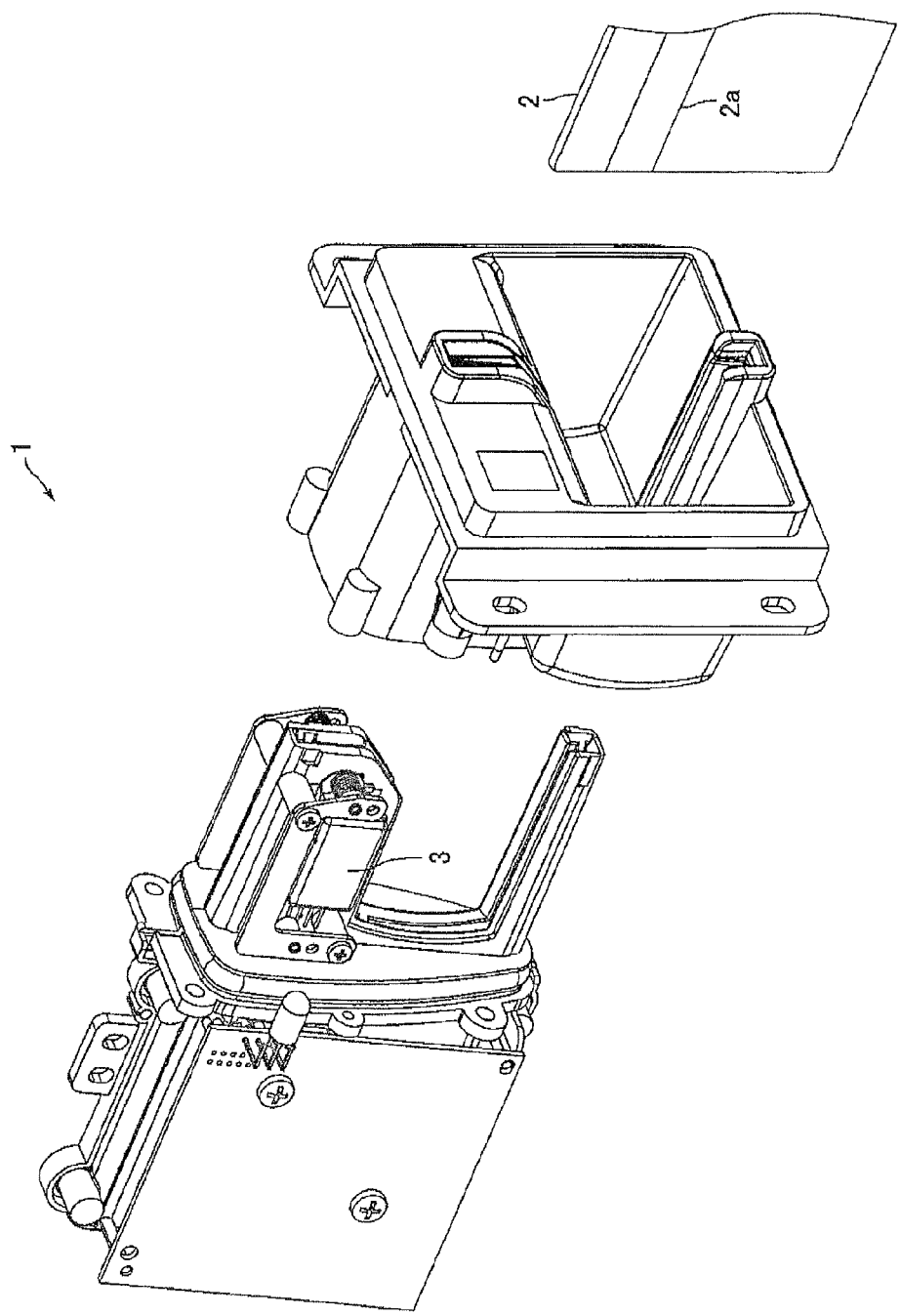
FIG. 1 is an exploded perspective view of a card reader according to an embodiment of the present invention.

General Structure of Card Reader:

FIG. 1 is an exploded perspective view of a card reader 1 according to an embodiment of the present invention.

The card reader 1 of the present embodiment is a device for reading magnetic data recorded in a card 2 while a user manually handles the card 2. Specifically to describe, the card reader 1 is a card reader of a dip type, which reads magnetic data of the card 2 at the time of inserting the card 2 into the card reader 1, or at the time of drawing out the card 2 already inserted in the card reader 1. The card reader 1 is used while being installed, for example, in a gas filling device of an unmanned or self-serve gas station.

The card 2 is, for example, a rectangular PVC-made card having a thickness of 0.7 to 0.8 mm. A magnetic stripe 2a, in which magnetic data is recorded, is formed in the card 2. Incidentally, the card 2 may be a card made of polyethylene terephthalate (PET) having a thickness of 0.18 to 0.36 mm, or a paper card with a predetermined thickness.

Figure 3:
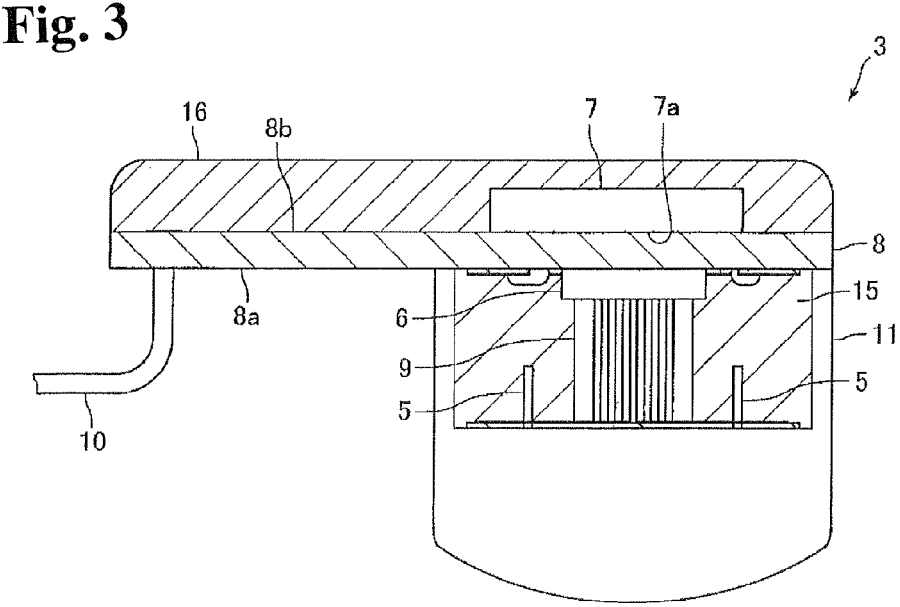
FIG. 3 is a cross-section view taken from a line E-E shown in FIG. 2.

The card reader 1 is equipped with two magnetic heads 3 placed face-to-face each other across a card passing path through which the card 2 passes (One of the magnetic heads 3 is not shown in FIG. 3). As a result, in the card reader 1, the magnetic data of the card 2 can be read no matter which direction the card 2 is oriented toward at the time of being inserted. A structure of each of the magnetic heads 3 is described below.

Figure 2:
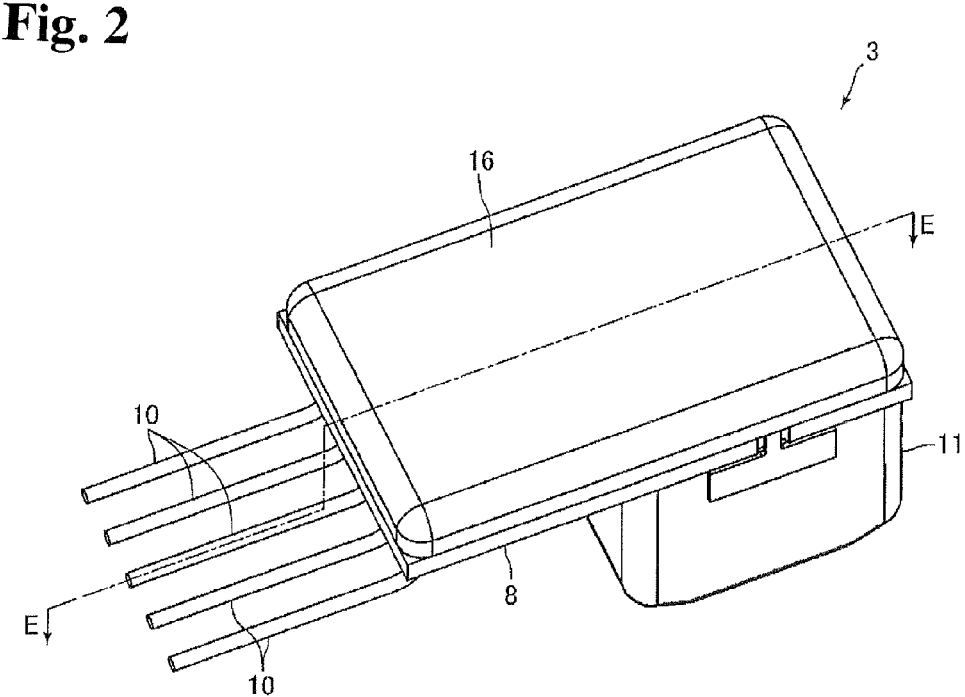
FIG. 2 is a perspective view of a magnetic head shown in FIG. 1.
Figure 4:
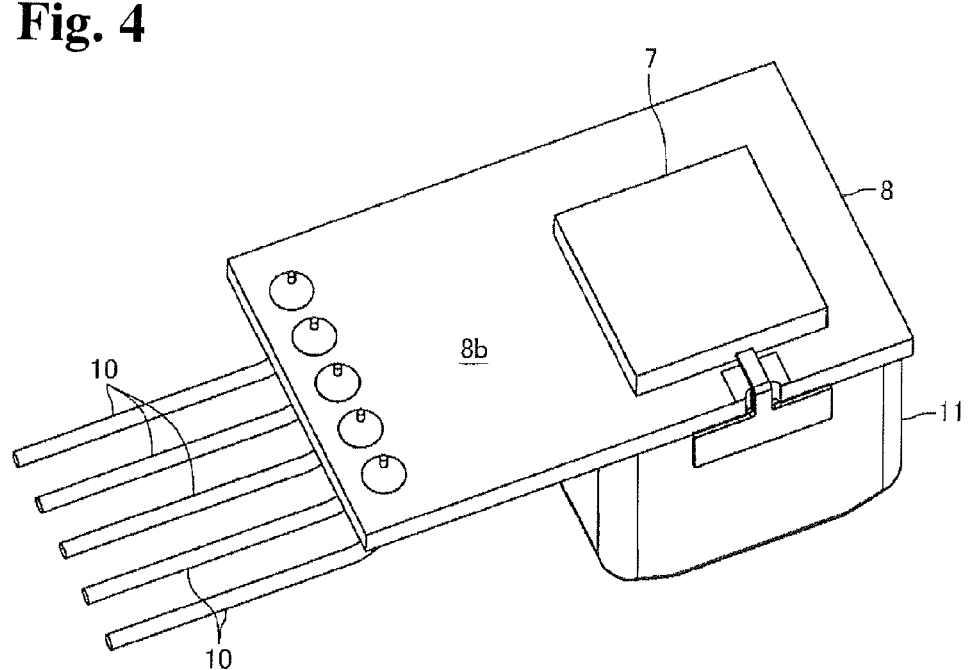
FIG. 4 is a perspective view of the magnetic head shown in FIG. 2, from which a resin part is removed.
Figure 5:
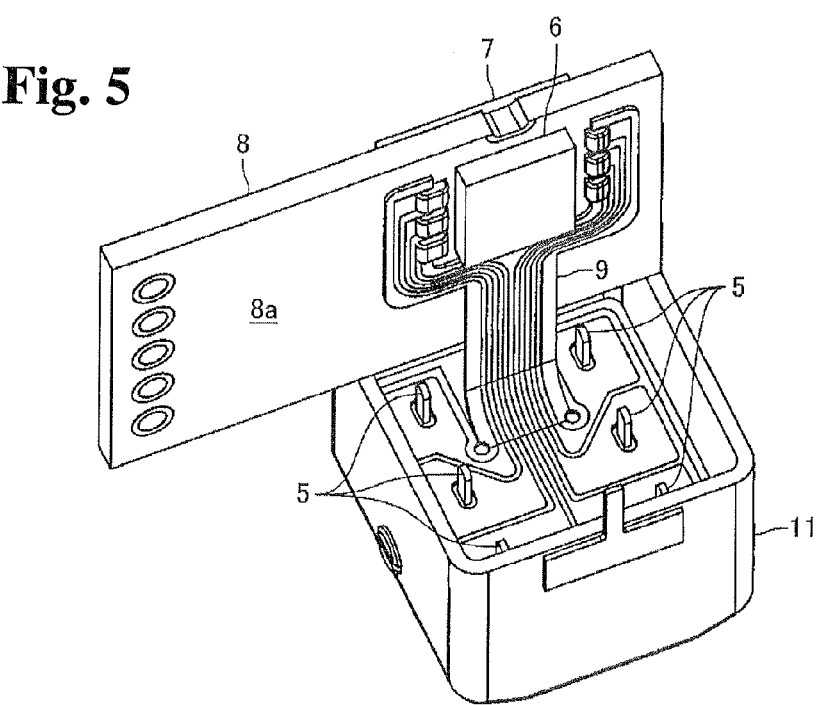
FIG. 5 is a perspective view of the magnetic head shown in FIG. 2, under a condition before fixing a substrate to a case body.
Figure 6:
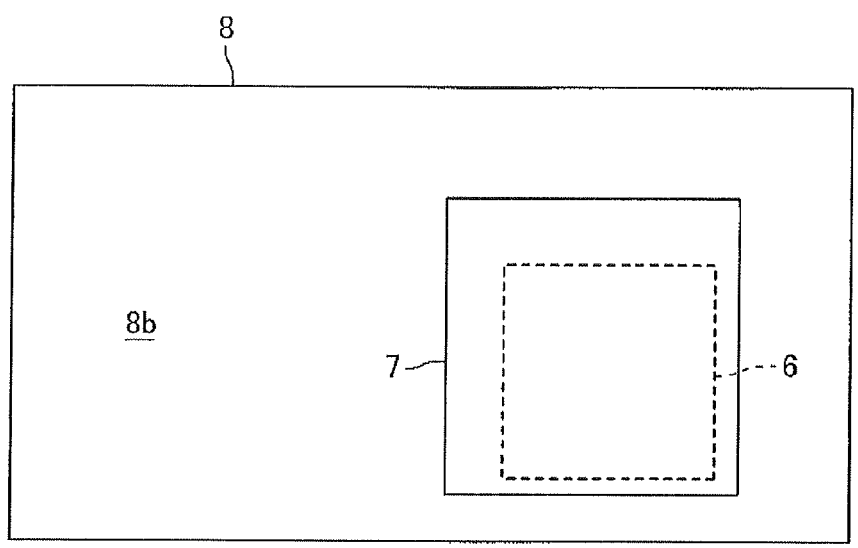
FIG. 6 is a plan view of the substrate shown in FIG. 2 viewed in a thickness-wise direction of the substrate, for explaining a positional relationship between a demodulating IC and a CPU.

Structure of Magnetic Head:

FIG. 2 is a perspective view of a magnetic head 3 shown in FIG. 1. FIG. 3 is a cross-section view taken from a line E-E shown in FIG. 2. FIG. 4 is a perspective view of the magnetic head 3 shown in FIG. 2, from which a resin material 16 is removed. FIG. 5 is a perspective view of the magnetic head 3 shown in FIG. 2, under a condition before fixing a substrate 8 to a case body 11. FIG. 6 is a plan view of the substrate 8 shown in FIG. 2 viewed in a thickness-wise direction of the substrate 8, for explaining a positional relationship between a demodulating IC 6 and a CPU 7.

The magnetic head 3 is a magnetic head of a 3-channel type, which can read 3-track magnetic data formed in a magnetic stripe 2a of the card 2. The magnetic head 3 includes a core (not shown in the drawings) in which a magnetic gap for reading the magnetic data is formed, a coil (not shown in the drawings) wound on the core, and terminals 5 to which ends of the coil are connected.

Moreover, the magnetic head 3 further includes the substrate 8 on which the demodulating IC 6 and the CPU 7 are mounted, a flexible print circuit board (FPC) 9 as a cable for electrically connecting the terminals 5 and the demodulating IC 6, and lead wires 10 led out of the substrate 8. The core, the roil, the terminals 5, and the FPC 9 are stored in the case body 11 of the magnetic head 3.

The core is fixed to the case body 11 in such a way that the magnetic gap is positioned at a lower end of the magnetic head 3 shown in FIG. 3. A location hole (not shown in the drawing) for locating the core is formed at a bottom surface of the case body 11 shown in FIG. 3.

The demodulating IC 6 serves a function of demodulating an analog output signal output from the terminals 5 to create a digital demodulated signal. In other words, the demodulating IC 6 according to the present embodiment is a demodulating electronic component that demodulates the analog output signal output from the terminals 5 to create the digital demodulated signal. The demodulating IC 6 is so formed as to be a rectangular parallelepiped.

The CPU 7 serves a function of encrypting the demodulated signal by using a predetermined encrypting function and key data to create an encrypted signal. In other words, the CPU 7 according to the present embodiment is an encrypting electronic component that encrypts the demodulated signal to create the encrypted signal. The CPU 7 is so formed as to be a rectangular parallelepiped. In the present embodiment, an external profile of the CPU 7 viewed in a flat side direction (in a vertical direction in FIG. 3) is greater than an external profile of the demodulating IC 6 viewed in the flat side direction.

On a mounting surface 7a of the CPU 7 for mounting onto the substrate 8, there are placed a plurality of electrodes (not shown in the drawings) for electrically connecting the CPU 7 to the substrate 8. Concretely to describe, on the mounting surface 7a of the CPU 7, there are placed solder balls (solder bumps), each of which being formed almost like a hemisphere, being laid out in a lattice pattern. In other words, the CPU 7 according to the present embodiment is an electronic component of a BGA type (Ball Grid Array), in which a plurality of solder balls are placed on the mounting surface 7a for mounting onto the substrate 8.

The demodulating IC 6 is mounted on one side 8a (a lower side surface in FIG. 3) of the substrate 8. Meanwhile, the CPU 7 is mounted on the other side 8b (an upper side surface in FIG. 3) of the substrate 8. In other words, the demodulating IC 6 and the CPU 7 are individually mounted on each different side surface of the substrate 8. Moreover, in the present embodiment, the demodulating IC 6 and the CPU 7 are mounted onto the substrate 8 in such a way that the demodulating IC 6 is included within the external profile of the CPU 7 in a view of a thickness-wise direction (in a vertical direction in FIG. 3) of the substrate 8, as shown in FIG. 6. Namely, the demodulating IC 6 and the CPU 7 are mounted onto the substrate 8 in such a way that an entire area of the demodulating IC 6 is overlaid with the CPU 7 in a view of the vertical direction in FIG. 3.

The substrate 8 is a multilayer board in which an insulation layer and a conductive layer, not shown in the drawings, are alternately laminated. For example, the substrate 8 is a 4-layer substrate. In the present embodiment, a conductor pattern (not shown in the figures) of the substrate 8 for electrically connecting the demodulating IC 6 and the CPU 7 is so guided as to be included within the external profile of the CPU 7 in a view of the thickness-wise direction of the substrate 8. Namely, in the present embodiment, the conductor pattern of the substrate 8 for electrically connecting the demodulating IC 6 and the CPU 7 is formed at a lower side of the CPU 7 shown in FIG. 3.

The substrate 8 is fixed to an upper end of the case body 11 shown in FIG. 3. Concretely to describe, the substrate 8 is fixed to the case body 11 in such a way, that the demodulating IC 6 is placed inside the case body 11 while the CPU 7 is placed outside the case body 11.

As shown in FIG. 4, end parts of the lead wires 10 are inserted through from the one side 8a of the substrate 8 toward the other side 8b of the same. The end parts of the lead wires 10 are soldered and fixed to a fixing pattern (not shown in the drawing) formed on the other side 8b of the substrate 8 so as to be connected to the CPU 7 via a conductor pattern (not shown in the figure) inside the substrate 8.

As shown in FIG. 3, an internal area of the case body 11 is filled with a resin material 15. The resin material 15 is, for example, an epoxy-base opaque resin material that also serves a function of fixing the substrate 8 to the case body 11. In the meantime, the other side 8b of the substrate 8 as well as an entire section of the CPU 7 are covered with the resin material 16, as shown in FIG. 2. In other words, the other side 8b of the substrate 8 and the entire section of the CPU 7 are sealed with the resin material 16. The resin material 16 is, for example, an epoxy-base opaque resin material.

As described above, the FPC 9 is stored in the case body 11. The FPC 9 is so guided inside the case body 11 as not to contact an internal surface of the case body 11.

Primary Advantageous Effect of the Present Embodiment:

As explained above, the CPU 7 is located outside the case body 11 in the present embodiment. Therefore, being compared with a case having the CPU 7 located inside the case body 11, the present embodiment makes it possible to downsize the case body 11. Accordingly, the present embodiment makes it possible to downsize the magnetic head 3.

According to the present embodiment, the coil, the terminals 5, the demodulating IC 6, and the FPC 9, which the magnetic head 3 includes, are located inside the case body 11. Therefore, it is difficult for a criminal to illegally obtain a signal before encryption, without either removing the substrate 8 from the case body 11, or drilling a hole in the case body 11. Furthermore, in the present embodiment, the CPU 7 is an electronic component of a BGA type. Accordingly, even though the CPU 7 is located outside the case body 11, it is difficult for the criminal to attach a signal wire to the electrodes of the CPU 7, electrically connecting the CPU 7 and the substrate 8; and it is difficult for the criminal to illegally obtain a demodulated signal before encryption from the electrodes of the CPU 7. Moreover, in the present embodiment, the conductor pattern of the substrate 8 for electrically connecting the demodulating IC 6 and the CPU 7 is so guided as to be included within the external profile of the CPU 7 in a view of the thickness-wise direction of the substrate 8. Accordingly, even though the CPU 7 is located outside the case body 11, it is difficult for the criminal to illegally obtain a signal before encryption from the conductor pattern of the substrate 8. Therefore, according to the present embodiment, it becomes possible to prevent the criminal from illegally obtaining magnetic information of the card 2.

Furthermore, according to the present embodiment, the other side 8b of the substrate 8 and the entire section of the CPU 7 are covered with the resin material 16. Accordingly, even though the CPU 7 is located outside the case body 11, it is further difficult for the criminal to take out a demodulated signal before encryption from the other side 8b of the substrate 8, on which the CPU 7 is mounted. Therefore, according to the present invention, it becomes possible to effectively prevent the criminal from illegally obtaining magnetic information of the card 2.

According to the present embodiment, the internal area of the case body 11 is filled with a resin material 15. Therefore, if the criminal removes the substrate 8 from the case body 11 by force, the FPC 9 gets broken and/or the demodulating IC 6 gets damaged. Accordingly, in the case of the present embodiment, even if the criminal removes substrate 8 from the case body 11, it is difficult to illegally obtain a signal before encryption.

According to the present embodiment, the FPC 9 is so guided inside the case body 11 as not to contact an internal surface of the case body 11. Therefore, even if the criminal drills a hole in the case body 11, the FPC 9 inside the case body 11 cannot easily be found. Accordingly, in the case of the present embodiment, even if the criminal drills a hole in the case body 11, it is difficult to illegally obtain a signal before encryption from the FPC 9.

Other Embodiments:

Described above is an example of a preferred embodiment according to the present invention. However, the present invention is not limited to the above embodiment and various variations and modifications may be made without changing the concept of the present invention.

In the embodiment described above, the CPU 7 is an electronic component of a BGA type, in which a plurality of solder balls are placed on the mounting surface 7a for mounting onto the substrate 8. Alternatively, for example, the CPU 7 may be an electronic component of a LGA type (Land Grid Array), in which a plurality of flat electrodes are laid out on the mounting surface 7a in a lattice pattern. Furthermore, alternatively, the CPU 7 may be an electronic component of a PGA type (Pid Grid Array), in which a plurality of spiky pin electrodes are laid out on the mounting surface 7a in a lattice pattern.

In the embodiment described above, the terminals 5 and the demodulating IC 6 are electrically connected with the FPC 9. Alternatively, for example, the terminals 5 and the demodulating IC 6 may electrically be connected with a lead wire.

In the embodiment described above, the magnetic head 3 is a magnetic head of a 3-channel type, which can read 3-track magnetic data formed in a magnetic stripe 2a. Alternatively, for example, the magnetic head 3 may be a magnetic head of a 2-channel type, which can read 2-track magnetic data formed in a magnetic stripe 2a.

In the embodiment described above, the demodulating IC 6 and the CPU 7 are mounted onto the substrate 8 in such a way that the demodulating IC 6 is included within the external profile of the CPU 7 in a view of the thickness-wise direction of the substrate 8. Alternatively, for example, the demodulating IC 6 and the CPU 7 may be mounted onto the substrate 8 in such a way that a part of the demodulating IC 6 spreads beyond the external profile of the CPU 7 in a view of the thickness-wise direction of the substrate 8.

In the embodiment described above, the card reader 1 is a card reader of a dip type. Alternatively, for example, a card reader equipped with the magnetic head 3 of the embodiment described above may be a so-called swipe-type card reader with which magnetic data of the card 2 is read while the card 2 moves along a card passing path formed so as to be a groove shallower than a lateral width of the card 2. Furthermore, a card reader equipped with the magnetic head 3 of the embodiment described above may be a card reader of a card transfer type equipped with a card transfer mechanism.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

Reference Numerals

1. Card reader
2. Card
3. Magnetic head
5. Terminals
6. Demodulating IC (Demodulating electronic component)
7. CPU (Encrypting electronic component)
7a. Mounting surface
8. Substrate
8a. One side
8b. Other side
9. FPC (Flexible print circuit board, or Cable)
11. Case body
15. Resin material
16. Resin material

What is claimed is:

1. A magnetic head comprising:
a core in which a magnetic gap is formed for reading magnetic data recorded in a card;
a coil wound on the core;
terminals to which ends of the coil are connected;
a substrate on which are mounted:
a demodulating electronic component for demodulating an analog output signal output from the terminals to create a digital demodulated signal; and
an encrypting electronic component for encrypting the demodulated signal to create an encrypted signal;
a cable which electrically connects the demodulating electronic component and the terminals; and
a case body which stores the core, the coil, the terminals, and the cable;
wherein the demodulating electronic component is mounted on a first side of the substrate;
wherein the encrypting electronic component is mounted on a second side of the substrate opposite to the first side; and
wherein the substrate is fixed to the case body in such a way that the demodulating electronic component is arranged inside the case body while the encrypting electronic component is arranged outside the case body.

2. The magnetic head according to claim 1;
wherein electrodes which electrically connect the encrypting electronic component to the substrate are placed on a mounting surface of the encrypting electronic component to mount the encrypting electronic component onto the substrate.

3. The magnetic head according to claim 2;
wherein the encrypting electronic component is an electronic component of a Ball Grid Array type, in which the plurality of electrodes are placed on the mounting surface, each of the electrodes being almost like a hemisphere.

4. The magnetic head according to claim 1;
wherein the substrate is a multilayer board in which an insulation layer and a conductive layer are alternately laminated; and
wherein a conductor pattern of the substrate for electrically connecting the demodulating electronic component and the encrypting electronic component is included within an external profile of the encrypting electronic component in a view of a thickness-wise direction of the substrate.

5. The magnetic head according to claim 1;
wherein the demodulating electronic component is included within an external profile of the encrypting electronic component in a view of a thickness-wise direction of the substrate.

6. The magnetic head according to claim 1;
wherein the encrypting electronic component as well as the second side of the substrate are covered with a resin material.

7. The magnetic head according to claim 1;
wherein an internal area of the case body is filled with a resin material.

8. The magnetic head according to claim 7;
wherein the cable is so arranged inside the case body as not to contact an internal surface of the case body.

9. A card reader comprising:
the magnetic head according to any one of claim 1 to claim 8.

* * * * *